H. A. BULLARD.
FLUID ENGINE AND PUMP.
APPLICATION FILED AUG. 4, 1915.
1,210,042.
Patented Dec. 26, 1916.
3 SHEETS—SHEET 1.
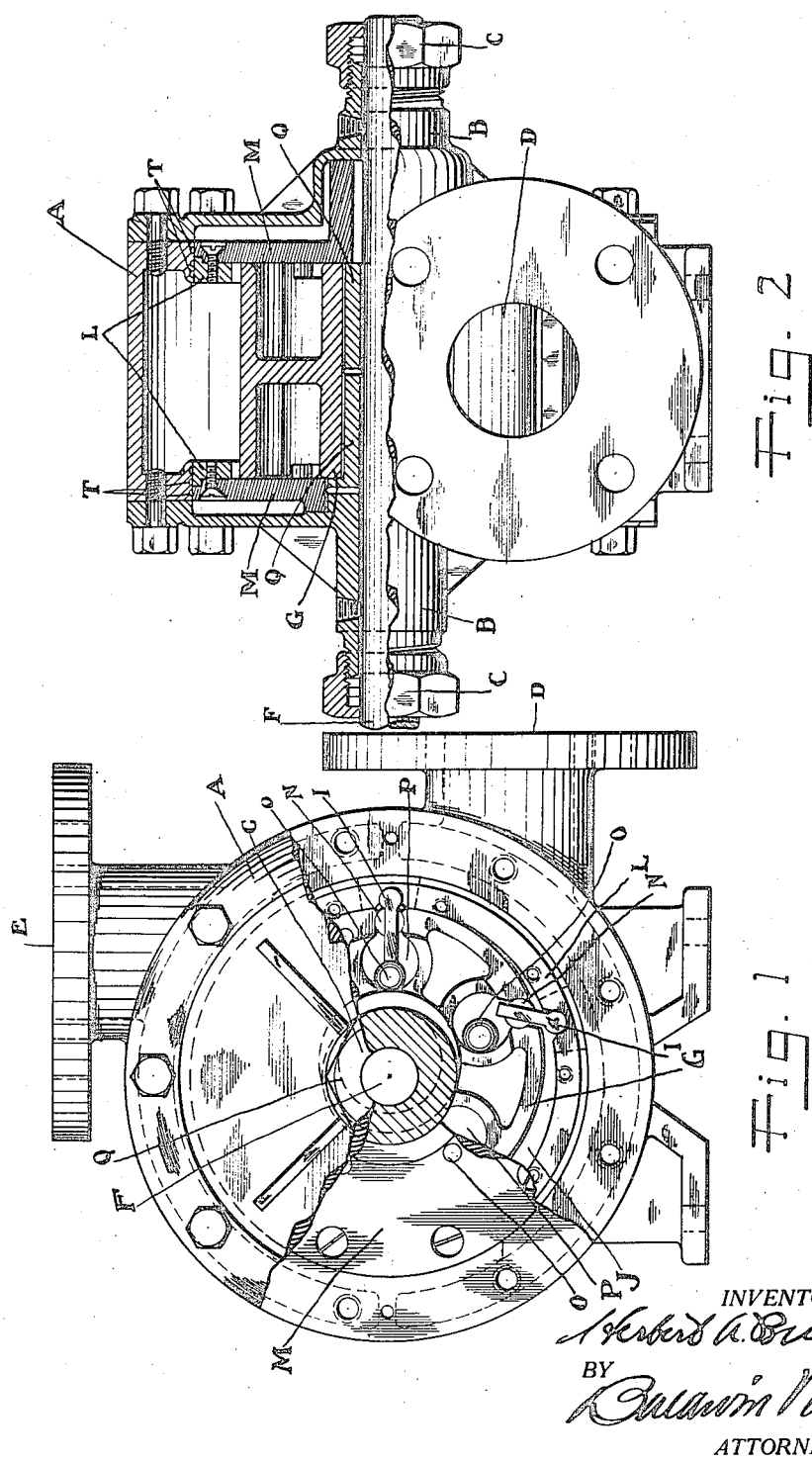
INVENTOR.
Herbert A. Bullard
BY
ATTORNEY.

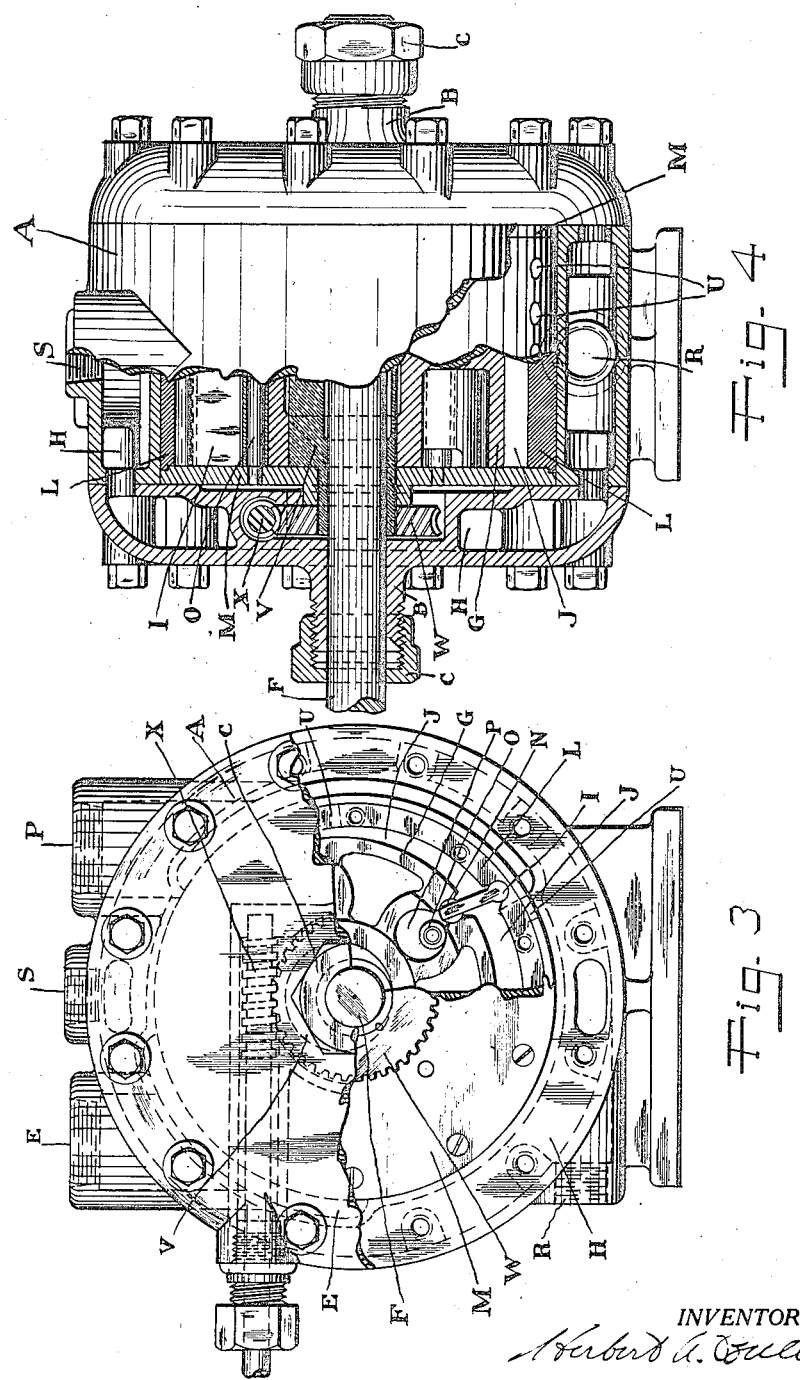

H. A. BULLARD.
FLUID ENGINE AND PUMP.
APPLICATION FILED AUG. 4, 1915.

1,210,042.

Patented Dec. 26, 1916.
3 SHEETS—SHEET 3.

INVENTOR.
Herbert A. Bullard
BY
Baldwin Valy
ATTORNEY.

UNITED STATES PATENT OFFICE.

HERBERT A. BULLARD, OF SAN FRANCISCO, CALIFORNIA.

FLUID ENGINE AND PUMP.

1,210,042.   Specification of Letters Patent.   Patented Dec. 26, 1916.

Application filed August 4, 1915.   Serial No. 43,618.

*To all whom it may concern:*

Be it known that I, HERBERT A. BULLARD, a citizen of the United States, residing at San Francisco, in the county of San Francisco and State of California, have invented a new and useful Improvement in Fluid Engines and Pumps, of which the following is a specification.

My invention relates to rotary or differential engines, in which the force of gases or liquids under pressure, acts upon radial vanes to cause rotary motive power; and in rotary or differential pumps in which rotary mechanical force actuates radial vanes for the purpose of pumping liquids or gases under various conditions of head pressure and exhaust.

The general construction of a rotary or differential engine or pump, comprises a cylindrical case with inlet and outlet, and supporting bearings with stuffing boxes, through which operates a shaft.

The objects of my improvement are, first, to minimize relative motion between the various operating parts, thereby reducing frictional losses, facilitating lubrication, and increasing the efficiency; second, to minimize sliding contacts between the various operating parts, thereby reducing wear and tear, facilitating sealing, and preventing loss of pressure by leakage back; third, to minimize bulk, weight and cost, by permitting the use of relatively high rotative speeds suitable for direct connection between driver and driven; fourth, to minimize vibration and pulsation, affording noiseless operation through well balanced rotating elements, insuring uniform flow of fluids; fifth, to regulate, either arbitrarily or automatically, the point of cut off when used as a gas propelled engine; or the pressure of discharge, when used as a gas compressor; and sixth, to handle thin, thick or viscous fluids, or fluids carrying much solid matter or grit. I attain these objects by the mechanism illustrated in the accompanying drawings in which—

Figure 6:
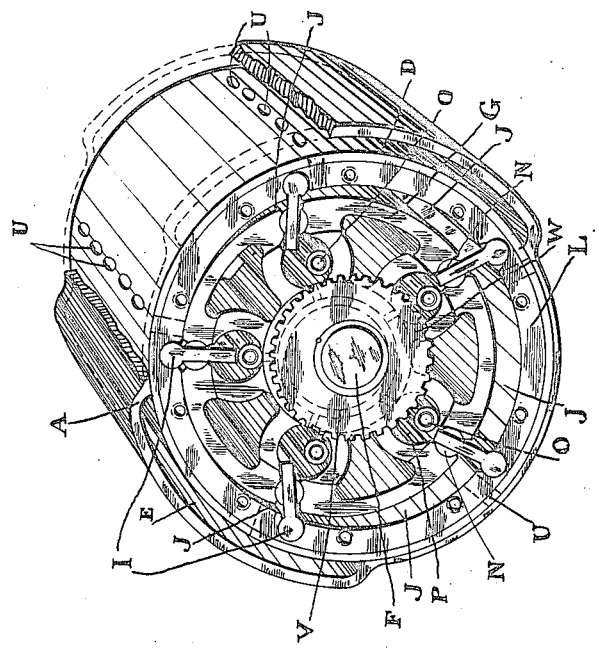
Figure 5:
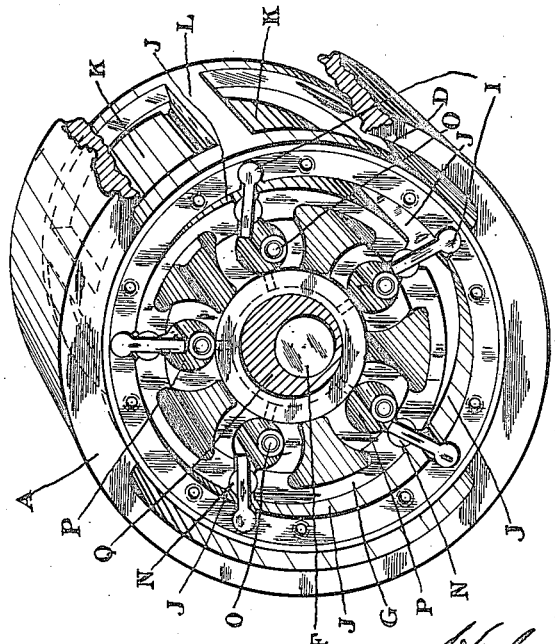

Figure 1 is an end view of a liquid engine, or a liquid pump with the case and one of the side plates partly broken away. Fig. 2 is an elevation and partial section, through center line, of a liquid engine or a liquid pump. Fig. 3 is an end view of a gas driven engine, or a gas pump with the case and one of the side plates partly broken away. Fig. 4 is an elevation and partial section, through center line, of a gas driven engine, or a gas pump. Fig. 5 illustrates the internal parts of a liquid engine, or a liquid pump, and Fig. 6 illustrates the internal parts of a gas driven engine, or a gas pump.

Similar letters refer to similar parts throughout the several views.

In the construction shown in all of the several views, a rotatable carrier L with side plates M is interposed between the rotor G and the outer casing A. The vanes I are hinged to the rotatable carrier L and operate in the rotor G through slotted hinged points N. The rotor G is caused to revolve synchronously with the rotatable carrier L and side plates M through any suitable means, such as shown by the arrangement of studs O attached to the plates M and passing through holes P in the rotor G. The rotatable carrier L, through one of the plates M, is attached to the shaft F and revolves therewith, and the rotor G is thus caused to revolve about an eccentrically mounted bearing Q which in Figs. 1, 2 and 5 is made a part of the stationary case A; and in Figs. 3, 4 and 6 a similar bearing V is made adjustable about the shaft F, this being accomplished by any suitable means such as shown, through the worm gear W and the worm X. One of the plates M is not attached to the shaft F directly but is provided with a concentric bearing on Q or on V according to the construction used.

Referring to Fig. 5 the openings K in carrier L allow free flowage of liquid to and from the pocket J and are of such a nature that an ample clearance space is afforded between the outer rim of G and the inner surface of case A; this space facilitates the handling of liquids containing grit or much solid matter.

Referring to Fig. 6 any variation of the axis' eccentricity as by the bearing V about the shaft F changes the point of contact between the outer rim of rotor G and the inner surface of carrier L, with reference to the points of inlet and outlet.

When operated as a gas pump, or compressor, with the parts rotating in a clockwise manner, any partial rotation of the bearing V in a counter direction will cause increased compression of the gas in pockets J before final discharge through ports U into the outlet chamber E. This counter rotation of V, when carried to a maximum, equal in number of degrees, to that embraced by the outlet chamber E, would cause a maximum compression of the gas before discharge, and a suitable arbitrary or automatic control of the degree of rotation of V will act to regulate the pressure of discharge as may be found desirable to meet varying requirements. When used as a gas propelled engine, with the parts rotating in a counter clockwise direction, a suitable arbitrary or automatic control of the degree of rotation of V will act to regulate the point of cut off for the gas entering pockets J through ports U as may be found desirable to meet varying requirements.

Certain other parts of the device are the bearings B, the stuffing boxes C and the inlets D.

In Figs. 3 and 4 a water jacket H is provided for cooling purposes having the inlet R and the outlet S.

By general reference to all views it is obvious that the rotor G revolves within the carrier L but about a different center, comprising a differential construction in which all sliding contact, and practically all frictional resistance between the outer ends of vanes I and the carrier L is eliminated, there is no canting or cramping force on the vanes I creating undue friction in the slotted hinges N, and there is no need of springs or compensating pressure to insure non-leaking contacts. The vanes I and the side plates M revolving synchronously cause only a very slight relative motion between them, and a practically non-leak contact is obtained due to relatively little wear; a spring actuated packing strip may be used for extraordinarily high pressure. To prevent leakage and consequent loss of pressure between the surfaces of the rotatable carrier L with the plates M and the outer case A, the latter is provided with circular grooves T which allow ample running clearance at the same time preventing leakage back.

By thus minimizing the relative motion between the various operating parts, the frictional losses are greatly reduced, lubrication becomes a simple matter and the efficiency is greatly increased; wear and tear are greatly reduced, sealing is readily effected and loss of pressure through leakage back is reduced to a minimum. Bulk, weight and cost are reduced since relatively high rotative speeds can be used for direct connection between driver and driven; vibration and pulsation are removed, affording noiseless operation and all rotating elements are well balanced; a uniform flow of fluids results, either the point of cut off, or the pressure of discharge are regulatable, and all fluids of any character may be handled.

It is manifest and possible that the construction herein specified may be varied without departing from the principle of the invention and I desire it should be understood that the invention is not limited to any specific form or arrangements of parts except in so far as such limitations, or their mechanical equivalents are specified in the claims.

I claim—

1. A rotary engine including an inclosing case; a rotor eccentrically rotatable in said case; and a carrier interposed between said case and said rotor and worm mechanism for varying the axis of eccentricity of said rotor.

2. A rotary engine including an inclosing case; a rotor eccentrically rotatable in said case; a carrier interposed between said case and said rotor; and vanes pivotally engaging at one end said carrier, and slidable in said rotor.

3. A rotary engine including an inclosing case; a shaft journaled axially in said case; a carrier having side plates fixed on said shaft concentric with said case; a rotor eccentrically mounted in said casing; driving means interposed between said carriage and said rotor; and vanes pivotally engaging at one end said carrier and slidable in said rotor.

4. A rotary engine including an inclosing case having inlet and outlet openings; a shaft journaled axially in said casing; a rotor eccentrically mounted on said shaft; a carrier mounted axially on said shaft; vanes engaging said carrier and slidable in said rotor; and worm mechanism for varying the axis of eccentricity of said rotor.

5. A rotary engine including an inclosing case; a shaft journaled axially in said case; a rotor eccentrically mounted on said shaft and having transverse openings therethrough; a carrier mounted on said shaft concentric with said case; studs on said carrier engaging said openings; and vanes engaging said carrier and slidable in said rotor.

6. A rotary engine including an inclosing case; a shaft journaled axially in said case; a rotor eccentrically mounted on said shaft and having transverse openings therethrough; a carrier mounted on said shaft concentric with said case; studs on said carrier extending through said openings; vanes pivoted in said carrier and extending into openings; and oscillating packing interposed between said vanes and said rotor.

7. A rotary engine including an inclosing case having inlet and outlet openings; a shaft journaled axially in said case; a rotor eccentrically mounted on and driven by said shaft; a carrier interposed between said case and rotor and mounted on said shaft concentric with said case; driving means interposed between said rotor and carrier;

vanes pivoted in said carrier and slidable in said rotor; and means for varying the axis of eccentricity of said rotor.

8. A rotary engine including an inclosing case having inlet and outlet openings; a shaft journaled axially in said case; a rotor mounted eccentrically on said shaft; a carrier interposed between said case and rotor and mounted on said shaft concentric with said case, and having peripheral ports therethrough; vanes pivoted in said carrier and slidable in said rotor; and means for synchronously rotating said rotor and carrier.

In testimony whereof I have hereunto set my hand this 28th day of July, 1915.

HERBERT A. BULLARD.

Witnesses:
A. J. HENRY,
BALDWIN VALE.